United States Patent [19]

Funk et al.

[11] Patent Number: 4,747,912

[45] Date of Patent: May 31, 1988

[54] CRACKING FURNACE CONTROL

[75] Inventors: Gary L. Funk; William S. Stewart; Guy S. Pennington, Jr., all of Bartlesville, Okla.

[73] Assignee: Phillips Petroleum Company, Bartlesville, Okla.

[21] Appl. No.: 88,746

[22] Filed: Aug. 24, 1987

Related U.S. Application Data

[62] Division of Ser. No. 863,894, May 16, 1986, which is a division of Ser. No. 605,024, Apr. 27, 1984, Pat. No. 4,655,277.

[51] Int. Cl.$^4$ .......................... C10G 7/58; C06F 15/18
[52] U.S. Cl. ..................... 196/132; 422/62; 422/110; 422/109; 165/34; 364/500
[58] Field of Search ................. 208/DIG. 1, 130, 132, 208/80; 422/62, 110, 119, 109; 196/132; 585/1, 34, 37, 40; 165/1, 34, 39, 40

[56] References Cited

U.S. PATENT DOCUMENTS

| | | | |
|---|---|---|---|
| 1,930,456 | 10/1933 | Rumple | 236/15 B X |
| 1,932,574 | 10/1933 | Chuson | 165/101 |
| 3,081,823 | 3/1963 | Constantikes | 165/32 |
| 3,167,113 | 1/1965 | Kleiss | 165/1 |
| 3,271,472 | 9/1966 | Ogle et al. | 208/DIG. 1 |
| 3,322,938 | 5/1967 | Weiss | 165/30 |
| 3,349,024 | 10/1967 | Mayhue | 208/130 |
| 3,555,251 | 1/1971 | Shavit | 364/505 |
| 3,692,096 | 9/1972 | Petterson et al. | 165/101 |
| 4,129,176 | 12/1978 | Heyn et al. | 165/34 |
| 4,210,957 | 7/1980 | Spethman | 364/505 |
| 4,231,753 | 11/1980 | Stewart | 23/230 X |
| 4,236,218 | 11/1980 | Killebrew, Jr. et al. | 364/500 |
| 4,249,907 | 2/1981 | Callejas | 364/557 |
| 4,257,105 | 3/1981 | Stewart et al. | 364/501 |
| 4,318,178 | 3/1982 | Stewart et al. | 208/DIG. 1 |
| 4,371,944 | 2/1983 | Stewart et al. | 364/502 |
| 4,381,814 | 5/1983 | Funk | 165/1 |
| 4,492,624 | 1/1985 | Johnson et al. | 208/130 X |

FOREIGN PATENT DOCUMENTS 6802775 2/1981 U.S.S.R. ............................. 165/32

OTHER PUBLICATIONS

Liptak, B. J. ed., *Instrument Engineer's Handbook*, New York, Chilton Book Company, 1970, pp. 1437–1448 & 1511.

*Primary Examiner*—Helen M. S. Sneed
*Assistant Examiner*—Glenn Caldarola
*Attorney, Agent, or Firm*—Williams, Phillips & Umphlett

[57] ABSTRACT

For parallel heat exchangers, one using a more preferred heat exchange medium as a heat exchange source and another using a less preferred heat exchange medium, maximum use of the more preferred heat exchange medium is used prior to use of the less preferred heat exchange medium in achieving a desired total heat exchange through the parallel heat exchange system. In employing such a heat exchange system in a cracking process it is combined with individual control of flows of feed fluid and diluent fluid to a plurality of individual cracking tubes in a cracking furnace to maintain a desired mass flow of feed fluid and ratio of mass diluent fluid to steam fluid to each such cracking tube.

6 Claims, 2 Drawing Sheets

CRACKING FURNACE CONTROL

This application is a divisional of application Ser. No. 863,894, filed May 16, 1986, allowed, which is a divisional of application Ser. No. 605,024, filed Apr. 27, 1984, now U.S. Pat. No. 4,655,277.

This invention relates to control of feed to a process. In a particular aspect the invention relates to method and apparatus for control of a hydrocarbon cracking process. In a more particular aspect, this invention relates to method and apparatus for control of the vaporization of feedstock to a cracking furnace and control of the feed fluid and diluent fluid to a plurality of individual tubes of a cracking furnace.

In a process for producing ethylene, an ethane/propane feed stream or other suitable feed stream is fed into a cracking furnace. Within the cracking furnace the feed gas is converted into a gaseous product mixture. If the feed gas is ethane and/or propane the gaseous product mixture will contain primarily hydrogen, methane, ethylene, propylene, butadiene and small amounts of heavier gases. At the furnace exit this mixture is cooled, allowing removal of most of the heavier gases, and compressed.

The produce mixture is routed through various distillation columns where the individual components such as ethylene are purified and separated. The separated products, of which ethylene is the major product, then leave the ethylene plant to be used in numerous other processes for the manufacture of wide varieties of secondary products.

The primary function of the cracking furnace is to convert the feed stream to the desired product such as ethylene and/or propylene. Of primary concern in the operation of the cracking process is conversion of the feed material to desired product. In addition, however, the efficiency with which such material is produced and stability of operation of the process as a whole and the cracking furnace in particular are important considerations in maintaining a commercially competitive and productive operation.

It is thus an object to provide method and apparatus for control of feedstock to a process. Another object of the invention is to provide method and apparatus for temperature control of process feed material. Yet another object of the invention is to provide for control of feed fluid and diluent fluid to a plurality of individual cracking tubes of a cracking furnace. Another object of the invention is to provide a cracking process employing control of feedstock vaporization in combination with control of feed fluid and diluent fluid to individual cracking tubes of a cracking furnace.

In accordance with the invention the feed stream to a process is split between parallel heat exchangers with one of the parallel heat exchangers being used preferentially in bringing the feedstock to the desired feed temperature. A less preferred heat exchange medium is used only as required to maintain safe and flexible feedstock control and to supplement the preferred heat exchange medium. The heated feedstock is then introduced into a cracking furnace wherein the flow of feed fluid and diluent fluid to each of a plurality of individual cracking tubes are controlled to maintain the desired mass flow of feed material and mass ratio of diluent fluid to feed fluid in such cracking tubes.

In a preferred embodiment, water which has been used to quench the cracking reaction at the cracking furnace outlet is used preferentially to vaporize the feed through the cracking furnace with steam being used to provide supplemental heat for feedstock heating. The thus-heated feed material is introduced into a cracking furnace in which the volume flow of feed fluid and diluent fluid to a plurality of cracking tubes is controlled to maintain desired mass flow and mass flow ratio conditions within limits of total flow and diluent pressure.

Other objects and advantages of the invention will be apparent from the description of the invention and the appended claims thereto as well as from the detailed description of the drawings.

For the sake of simplicity, the invention is illustrated and described in terms of a feed vaporizer having two parallel heat exchangers and in terms of a single cracking furnace having two cracking tubes. The invention is, however, also applicable to processes employing additional parallel heat exchangers in the feed vaporization system and/or a plurality of cracking furnaces each having any desired number of cracking tubes.

The invention is also illustrated and described in terms of a process for the manufacture of ethylene from an ethane/propane feedstock. The apparatus and method of the invention are, however, equally applicable to other processes employing the heating or cooling of a feed material in parallel heat exchangers and/or the use of a thermal cracking furnace to crack any appropriate feed into some desired component or components.

Figure 1:
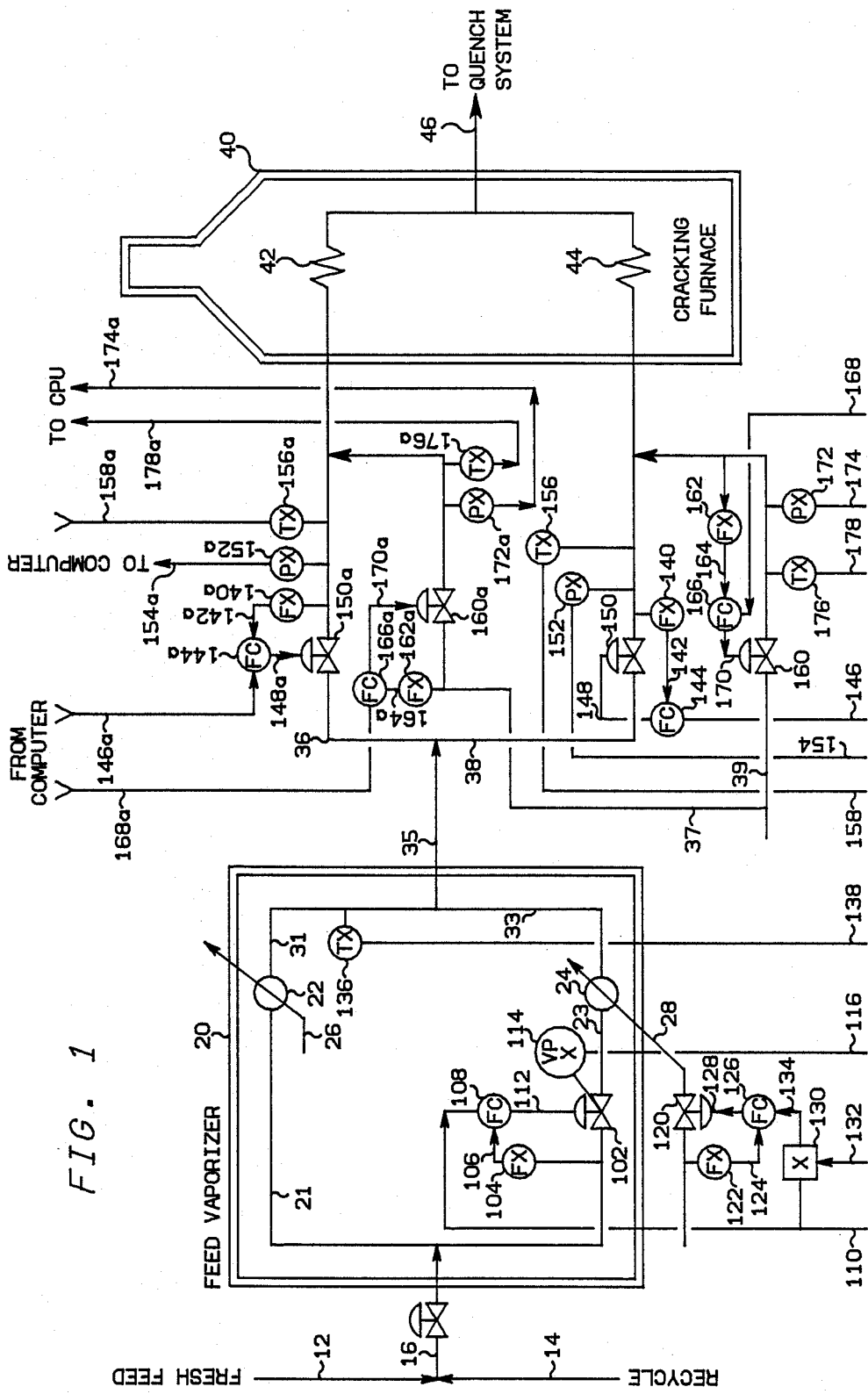
FIG. 1 is a schematic diagram of a cracking process including a feed vaporizer and cracking furnace.
Figure 2:
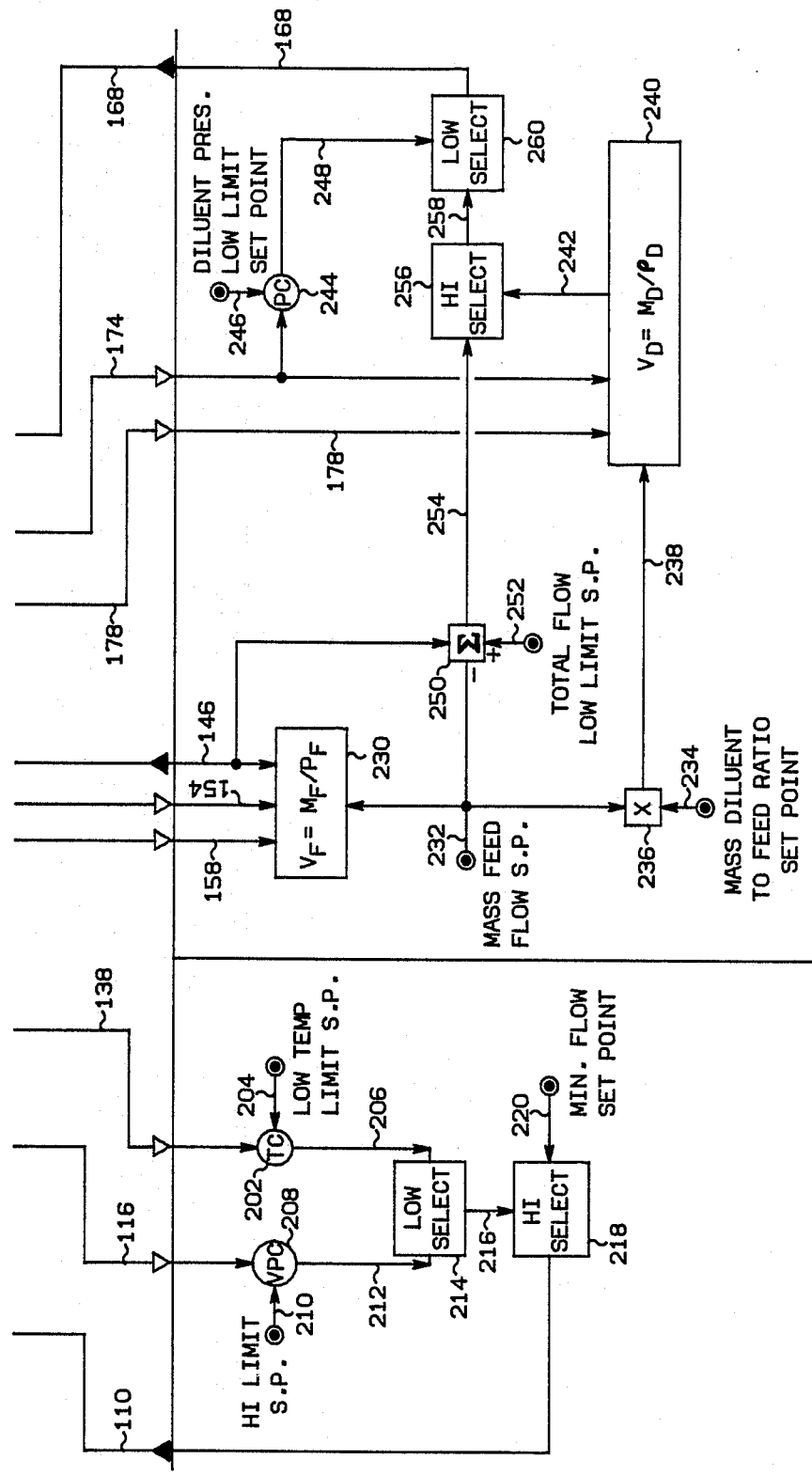
FIG. 2 is a schematic logic diagram for the computer logic utilized to generate the control signals used in control of the process of FIG. 1.

FIGS. 1 and 2 describe a particularly preferred control configuration for the sake of illustration. The invention can also be implemented using different types of control system configurations which accomplish the purpose of the invention. Lines schematically designated as signal lines in the drawings are preferably electrical or pneumatic in the preferred embodiment. However, any desired combination of pneumatic, mechanical, hydraulic, electrical, electronic or other signal means for transmitting information can be used. In almost all control systems some combination of these types of signals will be used. The use of any other type of signal transmission compatible with the process and equipment in use is within the scope of the invention.

A digital computer is preferred in implementing those aspects of the invention schematically illustrated by FIG. 2. Analog computers or other types of computing devices could also be used in implementing this aspect of the invention. A suitable digital computer is the Optrol 7000 process computer system manufactured by Applied Automation Incorporated, Bartlesville, Okla.

The controllers illustrated in FIGS. 1 and 2 may utilize various modes of control such as proportional, proportional-integral, proportional-derivative, or proportional-integral-derivative. In the preferred embodiment illustrated, proportional-integral-derivative controllers are utilized but any controller capable of accepting two input signals and producing a scaled output signal responsive to a comparison of the two input signals is within the scope of the invention. The operation of proportional-integral-derivative controllers is well known in the art. The output control signal of a proportional-integral-derivative controller can be represented as:

$$S = K_1 E + K_2 \int E \, dt + K_3 \, dE/dt$$

where S is the output control signal; E is the difference between the two input signals; and $K_1$, $K_2$ and $K_3$ are constants.

The scaling of an output signal by a controller is well known in control systems art. Essentially, the output of a controller may be scaled to represent any desired factor or variable. An example of this is where a desired flow rate and an actual flow rate are compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can vary from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, control elements of the system can be implemented using electrical analog, digital, electronic, pneumatic, hydraulic, mechanical and other similar types of equipment or combinations of one or more of such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or a desired process value is therefore one from which the information regarding the measured or desired value can be readily retrieved regardless of the exact mathematical relationship between the signal units and the measured or desired process units.

Referring now to the drawings and particularly to FIG. 1, a fresh feed stream 12, such as an ethane/propane feed mixture, and a recycle stream 14 are combined to provide a fluid feed stream 16. The fluid feed stream 16 is then introduced into a feed vaporizer 20 which comprises parallel heat exchangers 22 and 24. The fluid feed stream 16 is split to form a first fluid stream 21 which is provided to the first heat exchanger 22 and a second fluid stream 23 which is provided to the second heat exchanger 24.

In the heat exchanger 22, the first feed stream 21 is placed in heat exchange relationship with a preferred heat exchange fluid stream 26. In the embodiment illustrated, the preferred heat exchange fluid stream 26 comprises water which has been heated by quenching the cracking furnace effluent, although any preferred heat exchange fluid stream could be used. Since one of the objectives of the feed vaporization in the plant is to vaporize and superheat the incoming cold feed using as little energy as necessary and to maximize the capacity to supply heated feed to the process, use of the heated quench water as the preferred heat exchange stream 26 serves both to recover process heat, thereby minimizing the amounts of supplemental energy needed to vaporize and superheat the feed, and to maximize the amount of feedstock which can be adequately heated using other available heat exchange sources. In addition, the associated cooling of the quench water stream 26 results in a reduction in plant refrigeration requirements.

After heat exchange with the preferred heat exchange medium stream 26, the feed stream 21 leaves the heat exchanger 22 as a first effluent stream 31.

In a similar manner, the second heat exchanger 24 places the second feed stream 23 in a heat exchange relationship with a less preferred heat exchange stream 28 to produce a second vaporized and superheated effluent stream 33. In the embodiment illustrated, the less preferred heat exchange stream 28 uses 50# steam as the fluid placed in heat exchange relationship with the feed stream 23. Steam in this case is the less preferred heat exchange medium due to the expense required for its generation and, in accordance with the apparatus and method of the invention, its use is minimized.

The effluent streams 31 and 33 from the heat exchangers 22 and 24 are combined to form a combined effluent stream 35 in the form of vaporized, superheated feed fluid which is provided to the cracking furnace 40.

The cracking furnace 40 comprises a plurality of cracking tubes 42, 44. Each such cracking tube is provided with a respective feed fluid stream 36, 38 from the effluent stream 35 of the feed vaporizer 20, and a diluent fluid stream 37, 39 from a suitable source of such diluent fluid. Although any suitable diluent fluid acceptable for use in the cracking tubes of a particular unit can be used, the diluent fluid preferred for use in the illustrated process is steam. The diluent has a twofold benefit. First, the lower partial pressure of feed fluid obtained by adding diluent fluid thereto enhances the cracking reaction to obtain the desired olefin product while reducing hydrogen and methane production. Second, the diluent stream reacts with coke which can form on the cracking tubes and removes such coke deposits from the tubes. The control of steam to hydrocarbon ratio is therefore important both in achieving maximum conversion of the desired product and in extending the life of the cracking tubes.

The material exiting the cracking tubes 42, 44 of the cracking furnace 40 as a product stream 46 is introduced immediately into a quench zone (not shown) in order to immediately extinguish the cracking reaction and avoid undesirable recombination or polymerization of the reaction products.

Flow control of the feed stream 23 to the heat exchanger 24 is provided by a valve 102. A flow transducer 104 produces a flow rate signal 106 representative of the rate of flow of the feed stream 23. A flow controller 108 accepts as inputs thereto the flow rate signal 106 and a set point signal 110 and provides in response thereto a flow control signal 112 to the valve 102. A valve position transducer 114 senses the position of the valve 102 and provides a valve position signal 116 representative thereof.

The flow of the less preferred heat exchange medium, in this case steam, as the heat exchange stream 28 to the heat exchanger 24 is controlled by a valve 120. A flow transducer 122 provides an output signal 124 representative of the rate of flow of steam to the heat exchanger 24 as an input to a flow controller 126. A scaling means 130 accepts the set point signal 110 as an input and applies a scaling factor represented by signal 132 thereto in order to provide a steam flow set point signal 134. In response to the measured steam flow signal 124 and the steam flow set point signal 134 the flow controller 126 produces a flow control signal 128 which is used to control the position of the valve 120.

The use of the scaling means 130 to maintain a desired relationship between the flow of feed material and steam to the heat exchanger 24 is particularly advantageous in assuring adequate heating of the feed stream 23 over a wide range of feed stream flow rates. While the illustrated scaling factor approach is most advantageous in circumstances where conditions of the feed stream 23 and the steam heat exchange 28 are maintained at relatively constant values, such a scaling factor approach can also be used when such streams are subject to minor variations in conditions. When significant changes in pressure, temperature or composition of either stream is anticipated, a more complex relationship between the fluid feed set point signal 110 and the steam set point signal 134 may be desirable.

A temperature transducer 136 produces a temperature signal 138 representative of the temperature of the effluent stream 31 from the heat exchanger 22 where it has undergone heat exchange with the preferred heat exchange medium stream 26.

A flow transducer 140 produces a feed fluid flow rate signal 142 representative of the flow rate through the feed fluid stream 38 to the cracking tube 44 of the cracking furnace 40. A flow controller 144 accepts as inputs thereto the flow rate signal 142 and a flow rate set point signal 146 and generates in response thereto a flow control signal 148 to which a flow control valve 150 is responsive. The valve 150 controls the flow rate of the feed fluid stream 38 to the cracking tube 44. A pressure transducer 152 generates a pressure signal 154 representative of the pressure of the feed fluid flowing to the cracking tube 44 and a temperature transducer 156 generates a temperature signal 158 representative of the temperature of the feed fluid flowing to the cracking tube 44.

The flow of diluent fluid or steam to the cracking tube 44 through the diluent fluid stream 39 is controlled by a valve 160. A flow transducer 162 produces a flow signal 164 representative of the rate of flow of diluent fluid through the diluent fluid stream 39. A flow controller 166 accepts the flow rate signal 164 and a set point signal 168 as inputs thereto, and, in response to the difference between the set point signal 158 and the flow rate signal 164 generates a flow control signal 170 to which the flow control valve 160 is responsive. A pressure transducer 172 produces a pressure signal 174 representative of the pressure of the steam flowing to the cracking tube 44 and a temperature transducer 176 produces a temperature signal 178 representative of the temperature of the steam provided to the cracking tube 44.

While the control of feed fluid and diluent fluid to each of a plurality of cracking tubes will be illustrated herein with reference to control of such streams to the cracking tube 44, control of feed fluid and diluent fluid to all cracking tubes of a plurality of furnaces or to as many such cracking tubes as is desired to provide stable and efficient process operation can be used in accordance with the invention. The flow control apparatus, measurement transducers, measurement signals, and set point signals for control of feed fluid and diluent fluid to each cracking tube will be analagous to those illustrated in conjunction with flow of the feed fluid stream 38 and the diluent fluid stream 39 to the cracking tube 44. In FIG. 1 the function of elements 140a, 142a etc. associated with the feed fluid stream 36 and the diluent fluid stream 37 entering the cracking tube 42 are analogous in function to the elements 140, 142 etc. Associated with the feed fluid stream 38 and the diluent fluid stream 39 entering the cracking tube 44.

Referring now to FIG. 2, the temperature signal 138 from the temperature transducer 136 of FIG. 1 is provided as an input signal to a temperature controller 202. A low temperature limit set point signal 204 is provided as the set point signal to the temperature controller 202 which produces an output signal 206 in response to the difference between the low temperature limit set point signal 204 and the temperature signal 138. The low temperature limit set point signal 204 will normally be representative of the lowest acceptable temperature to which the effluent stream 31 from the heat exchanger 22 must be heated. In the illustrated preferred process embodiment, the low temperature limit set point signal 204 would typically represent a temperature which is 10° C. above the boiling point of ethylene.

The valve position signal 116 is provided as an input to a valve position controller 208. The set point signal provided to the valve position controller 208 is a high limit set point signal 210 representative of the maximum valve position to be permitted for the valve 102 (FIG. 1). A typical value for the high limit set point signal 210 would be a value representative of 90 percent of the fully open position of the valve 102. The output signal 212 of the valve position controller 208 will therefore be a signal which, if selected as the flow set point signal 110, will tend to bring the position of the valve 102 from whatever its present value to a position which is 90 percent of its fully open position.

A low select means 214 selects between the lower valued of the temperature controller output signal 206 and the valve position controller output 212 and provides an output signal 216 equal in value to such lower valued signal. The selected low signal 216 is then provided as an input signal to a high select means 218 which selects the higher valued of the signal 216 and a minimum flow set point signal 220 and provides an output flow control signal 110 equal in value to such higher valued signal. The minimum flow set point signal 220 will typically be representative of a minimum flow rate, such as 5 percent of the maximum flow rate through the valve 102, to be permitted through the feed stream 23 entering the heat exchanger 24.

In normal operation, with the position of the valve 102 sufficiently open to permit flow in excess of that represented by the minimum flow set point signal 220 but less than the position represented by the high limit set point signal 210, the output signal 206 of the temperature controller 202 will be selected by the low select means 214 and high select means 218 as the flow control signal 110 provided as a set point signal to the flow controller 108 associated with the valve 102 and as a scaled set point signal 134 to the flow controller 126 associated with the valve 120. In this control mode, a temperature of the effluent stream 31 from the heat exchanger 22 higher than the temperature represented by the low temperature limit set point signal 204 will generate a flow control set point signal 110 which will cause the valve 102 to be further closed thereby forcing more of the content of the fluid feed stream 16 into the first fluid stream 21 and permitting less of the fluid feed stream 16 to enter the second fluid stream 23.

Similarly, a measured temperature represented by the temperature signal 138 which is less than the temperature represented by the low temperature limit set point signal 204 will result in more of the fluid feed stream 16 being provided to the second heat exchanger 24 through the second fluid stream 23. In this way the control system automatically transfers heating load from the first heat exchanger 22 to the second heat exchanger 24 as the first heat exchanger 22 becomes fully loaded. This also results in automatic recovery of all the heat available from the preferred heat exchange medium stream 26 regardless of the individual flow rates or other characteristics of the first fluid stream 21 and the preferred heat exchange stream 26. As the overall flow rate of the fluid feed stream 16 is controlled or manipulated by an operator or a separate control system or process conditions in the process units providing feedstock to the cracker, the control system of the invention independently minimizes the energy used to vaporize and superheat the feed to the cracking furnace.

The low select means 214 and high select means 218 serve to prevent the temperature controller 202 from providing a set point signal 110 which will result in a valve position further open than the position represented by the high limit set point signal 210 or a flow through the valve 102 which is less than the flow represented by the minimum flow set point signal 220. These override limits provide for good operation of the associated valve 102 by helping to prevent the valve from being forced to a fully open or fully closed position from which effective control is limited. In addition, the action of the high select means 218 in maintaining at least a minimum flow through valves 102 and 120 makes it possible to exert rapid control action in the event of a process upset.

The pressure signal 154 and the temperature signal 158 representative of the respective pressure and temperature of the feed fluid stream 38 are provided to a flow set point generating means 230 which generates, in response to the pressure signal 154, the temperature signal 158, and a mass flow set point signal 232, the flow set point signal 146 required to achieve the mass flow rate represented by the mass feed flow set point signal 232 at the existing temperature and pressure conditions of the feed fluid stream 38. In normal operation, the same mass feed flow set point signal 232 will often be used as the mass flow set point signal for each cracking tube of a cracking furnace. As coil conditions such as coking may vary in individual coils, however, different operating conditions dictated by such coil differences can be taken into account by providing an individualized mass flow set point for each cracking tube. The conversion performed by the flow set point generating means 230 will be of the general form $$V_F = M_F / \rho_F$$

where
 $V_F$ = feed volume flow set point signal 146,
 $M_F$ = feed mass flow set point signal 232, and
 $\rho_F$ = feed density.
Feed density can be measured, analyzed, calculated or otherwise automatically determined by any appropriate method known to those skilled in the art.

The mass feed flow set point signal 232 and a mass diluent to feed ratio of set point signal 234 are provided to a ratioing or multiplying means 236 which generates in response thereto a mass diluent flow set point signal 238. A steam flow set point generating means 240 utilizes the mass steam flow set point signal 238 along with pressure signal 174 and temperature signal 178 representative of the pressure and temperature respectively of the diluent fluid stream 39 provided to the cracking tube 44 and generates in response thereto a diluent flow set point signal 242 representative of the rate of diluent flow at existing conditions within the diluent stream 39 required to provide the mass diluent to feed ratio represented by the mass diluent to feed ratio set point signal 234. The conversion performed by the steam flow set point generating means 240 will be of the general form $$V_D = M_D / \rho_D$$

where
 $V_D$ = volume diluent flow set point signal 242,
 $M_D$ = mass diluent flow set point signal 238 and
 $\rho_D$ = diluent density.
Diluent density can be measured, analyzed, calculated or otherwise automatically determined by any appropriate method known to those skilled in the art.

The pressure signal 174 representative of the pressure of the diluent in the diluent fluid stream 38 is also provided as an input to a pressure controller 244. The set point to the pressure controller 244 is a diluent pressure low limit set point 246 representative of a minimum diluent pressure to be permitted in the diluent fluid stream 39 downstream of the flow control valve 160. In response to a comparison of the pressure signal 174 and the diluent pressure low limit set point signal 246 the pressure controller 244 generates an output signal 248 which, if selected as the flow set point signal 168, will maintain diluent pressure to the cracking tube 44 at the minimum desired level represented by the diluent pressure low limit set point signal 246.

A summing means 250 is provided with a total flow low limit set point signal 252 and feed flow set point signal 146 and/or mass feed flow set point signal 232 as inputs thereto and generates a difference signal 254 representative of the minimum flow of diluent required to maintain the total minimum flow represented by the total flow low limit set point signal 252 in the cracking tube 44. If the mass feed flow set point signal 232 is used, the summing means 250 should include means for multiplying the signal 232 by a constant or otherwise converting it to a volume flow equivalent.

A high select means 256 selects between the diluent flow set point signal 242 and the minimum diluent flow signal 254 and provides the input signal having the higher value as an output signal 258. A high select means 260 accepts as inputs thereto the output signal 258 from the high select means 256 and the pressure control signal 248 from the pressure controller 244 and provides as the diluent flow set point 168 the higher valued of these two input signals.

In the normal operating mode, the feed from set point signal 146 will be generated directly in response to the mass feed flow set point signal 232. In addition, the diluent flow set point signal 242 generated in direct response to the mass feed flow set point signal 232 and the mass diluent to feed ratio of set point signal 234 will be provided as the set point signal 168 to the flow controller 166. As with the mass feed flow set point signal, the mass diluent to feed ratio set point will normally be the same for all cracking tubes in a cracking furnace but can, if desired, be individually determined for each cracking tube.

In the event that the diluent flow rate represented by the diluent flow rate set point signal 242 is insufficient to provide the required minimum total flow through the cracking tube 44, the high select means 256 will provide an output signal 258 equal in value to the input signal 254 thereto and, assuming the diluent pressure represented by the pressure signal 174 is above the required minimum level, this value will be utilized as the set point signal 168. In the event that the steam pressure represented by the pressure signal 174 falls below the diluent pressure low limit set point signal 246, the pressure controller 244 will generate an output signal 248 which will be selected as the set point signal 168.

In the same manner that the flow of feed fluid and diluent fluid to the cracking tube 44 are controlled in response to the mass feed flow set point signal 232 and the mass diluent to feed ratio set point signal 234, the flows of diluent and feed to other cracking tubes such as cracking tube 42 are controlled using the corresponding temperature, pressure and flow measurements and set point signals which, as discussed hereinabove, are either the same for all cracking coils or are individualized or adapted by taking into account differences among cracking coils. In an analog implementation of the control logic a separate control circuit can be associated with each cracking tube. In the preferred method of implementation using a digital computer, the speed of the digital computer can be used to perform repetitive sequential generation of set point signals for use in association with a substantial number of cracking tubes without any loss in effective process control.

As known by those skilled in the art, additional signal conditioning means may be utilized, if desired, to prevent generation of control signals which are beyond the response range of the devices being controlled or which limit the rate of change of a control signal to a predetermined maximum, for example, in order to prevent or minimize process disturbances.

Controlling the operation of individual cracking tubes in accordance with the invention provides stable operation of the furnaces of a cracking unit and, in particular, provides for stable mass flows within the unit while, at the same time, assuring safety in operation through maintenance of minimum flow through each cracking tube and minimum steam pressure to each cracking tube. While it is not necessary to control each tube of each furnace in accordance with the invention, the control of each tube of each furnace in accordance with the invention is preferred.

In summary, a cracking process operated in accordance with the invention provides for both efficient utilization of a preferred heat exchange medium such as waste heat from the quench system in vaporizing the feed stream to a cracking furnace and provides for individual control of cracking coils within a cracking furnace in a manner which permits safe, stable cracking unit operation.

The invention has been described in terms of a preferred embodiment as illustrated in FIGS. 1 and 2. Specific components which can be used in the practice of this invention as illustrated in FIGS. 1 and 2 such as flow sensors and transducers, pressure transducers, temperature transducers, flow controllers, pressure controllers, valve position controllers, temperature controllers and control valves are each well known, commercially available control components such as are illustrated and described at length in Perry's Chemical Engineers Handbook, 4th Edition, Chapter 22, McGraw Hill.

While the invention has been described in terms of the presently preferred embodiment, reasonable variations and modifications are possible by those skilled in the art, within the scope of the described invention and the appended claims thereto.

That which is claimed is:

1. Apparatus comprising:
   a cracking furnace means having a plurality of cracking tubes;
   means for supplying a feed fluid to each of said plurality of cracking tubes;
   means for supplying a diluent fluid to each of said plurality of cracking tubes;
   means associated with each of a plurality of said cracking tubes for establishing a first signal representative of the temperature of feed fluid supplied to the associated cracking tube;
   means associated with each of said plurality of said cracking tubes for establishing a second signal representative of the pressure of feed fluid supplied to the associated cracking tube;
   means associated with each of said plurality of said cracking tubes for establishing a third signal representative of the temperature of diluent fluid supplied to the associated cracking tube;
   means associated with each of said plurality of said cracking tubes for establishing a fault signal representative of the pressure of diluent fluid supplied to the associated cracking tube;
   means associated with each of said plurality of said cracking tubes for establishing a fifth signal representative of a desired mass flow of feed fluid to the associated cracking tube;
   means associated with each of said plurality of said cracking tubes for establishing a sixth signal representative of a desired ratio of feed fluid mass flow to diluent fluid mass flow for the associated cracking tube;
   first flow control means associated with each of said plurality of said cracking tubes for controlling the flow of feed fluid to the associated cracking tube in response to said first signal, said second signal and said fifth signal for said associated cracking tube;
   set point generating means associated with each of said plurality of said cracking tubes for establishing a diluent flow set point signal representative of the desired flow of diluent fluid to the associated cracking tube in response to said third signal, said fourth signal, said fifth signal and said sixth signal for said associated cracking tube; and second flow control means associated with each of said plurality of said cracking tubes for controlling the flow of diluent fluid to the associated cracking tube in response to the diluent flow set point signal for said associated cracking tube.

2. Apparatus in accordance with claim 1 wherein each said set point generating means additionally comprises means for generating an alternative diluent flow set point signal in response to said fourth signal being representative of a diluent fluid pressure to said associated cracking tube below a preselected value.

3. Apparatus in accordance with claim 1 wherein each said set point generating means additionally comprises means for maintaining said diluent flow set point signal representative of a diluent fluid flow adequate to maintain a preselected minimum total flow of feed fluid and diluent fluid through the associated cracking tube.

4. Apparatus in accordance with claim 3 wherein each said set point generating means additionally comprises means for generating an alternative diluent flow set point signal in response to said fourth signal being representative of a diluent fluid pressure to said associated cracking tube below a preselected value.

5. Apparatus in accordance with claim 1 additionally comprising feed fluid heating means, said feed fluid heating means comprising:

means for dividing a fluid feed stream to provide a first fluid stream and a second fluid stream;

a first heat exchanger wherein said first fluid stream is passed in heat exchange relationship with a third fluid stream;

means for providing said first fluid stream to said first heat exchanger;

means for providing said third fluid stream to said first heat exchanger;

means for withdrawing said first fluid stream as a first effluent stream from said first heat exchanger;

a second heat exchanger wherein said second fluid stream is passed in heat exchange relationship with a fourth fluid stream;

means for providing said second fluid stream to said second heat exchanger;

means for providing said fourth fluid stream to said second heat exchanger;

means for withdrawing said second fluid stream as a second effluent stream from said second heat exchanger;

means for combining said first effluent stream and said second effluent stream to provide a combined effluent stream to said means for supplying a feed fluid to each of said plurality of cracking tubes;

means for establishing a temperature signal representative of the temperature of said first effluent stream;

means for controlling the flow of said second fluid stream in response to said temperature signal; and means for controlling the flow of said fourth fluid stream in response to said temperature signal.

6. An apparatus in accordance with claim 5, wherein said temperature signal establishing means establishes said temperature signal in response to the temperature of only said first effluent stream.

* * * * *